(12) United States Patent
Elkatatny et al.

(10) Patent No.: US 11,685,854 B1
(45) Date of Patent: Jun. 27, 2023

(54) CARBONATION-RESISTANT CEMENTITIOUS BLEND CONTAINING OLIVE WASTE

(71) Applicant: KING FAHD UNIVERSITY OF PETROLEUM AND MINERALS, Dhahran (SA)

(72) Inventors: Salaheldin Elkatatny, Dhahran (SA); Ahmed Abdulhamid Mahmoud, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 17/948,722

(22) Filed: Sep. 20, 2022

(51) Int. Cl.
| | |
|---|---|
| *C09K 8/487* | (2006.01) |
| *C04B 28/04* | (2006.01) |
| *C04B 18/24* | (2006.01) |
| *C04B 103/46* | (2006.01) |
| *C04B 103/50* | (2006.01) |
| *C04B 111/22* | (2006.01) |
| *C04B 103/40* | (2006.01) |

(52) U.S. Cl.
CPC ............ *C09K 8/487* (2013.01); *C04B 18/248* (2013.01); *C04B 28/04* (2013.01); *C04B 2103/408* (2013.01); *C04B 2103/46* (2013.01); *C04B 2103/50* (2013.01); *C04B 2111/22* (2013.01); *C04B 2201/50* (2013.01)

(58) Field of Classification Search
CPC ....... C09K 8/487; C04B 18/248; C04B 28/04; C04B 2103/408; C04B 2103/46; C04B 2103/50; C04B 2111/22; C04B 2201/50
See application file for complete search history.

(56) References Cited

U.S. PATENT DOCUMENTS

| | | | | |
|---|---|---|---|---|
| 9,062,241 | B2 | 6/2015 | Zamora et al. | |
| 11,162,014 | B2 | 11/2021 | Jones et al. | |
| 11,180,856 | B1 * | 11/2021 | Obot | C23F 11/185 |
| 2020/0039884 | A1 * | 2/2020 | Dubey | C04B 28/141 |

FOREIGN PATENT DOCUMENTS

| | | |
|---|---|---|
| CN | 108467707 A | 8/2018 |
| CN | 109721151 A | 5/2019 |

OTHER PUBLICATIONS

Sharaf Alkheder, et al., "Effect of olive waste (Husk) on behavior of cement paste", Case Studies in Construction Materials, vol. 5, 2016, pp. 19-25.

(Continued)

*Primary Examiner* — Crystal J. Lee
(74) *Attorney, Agent, or Firm* — Oblon, McClelland, Maier & Neustadt, L.L.P.

(57) ABSTRACT

A carbonation-resistant cementitious blend containing cement, an expandable agent present, a dispersion agent, a fluid loss additive, a defoamer, and an olive waste. Concrete samples made therefrom and methods of producing such concrete samples are also specified. The addition of olive waste provides enhanced durability (carbonation resistance) and maintains mechanical strength (e.g. compressive strength, tensile strength) after exposure to $CO_2$ and/or brine. The resulting concretes are suitable cementing material for oil and gas wells as well as wellbores for geologic carbon sequestration.

20 Claims, 5 Drawing Sheets

(56) References Cited

OTHER PUBLICATIONS

Manuel Cruz-Yusta, et al., "Use of Olive Biomass Fly Ash in the Preparation of Environmentally Friendly Mortars", Environmental Science & Technology, vol. 45, No. 16, Jul. 5, 2011, pp. 6991-6996 (Abstract only).
Kerrai Lila, et al., "Valorisation of organic waste: Use of olive kernels and pomace for cement manufacture", Journal of Cleaner Production, vol. 277, Aug. 21, 2020, 2 pages (Abstract only).
Salaheldin Elkatatny, et al., "Improved carbonation resistance and durability of Saudi Class G oil well cement sheath in $CO_2$ rich environments using laponite", Journal of Petroleum Science and Engineering, vol. 196, Aug. 26, 2020, 2 pages (Abstract only).

\* cited by examiner

CARBONATION-RESISTANT CEMENTITIOUS BLEND CONTAINING OLIVE WASTE

BACKGROUND OF THE INVENTION

Field of the Invention

The present disclosure relates to a carbonation-resistant cementitious blend, a carbonation-resistant concrete formed from the carbonation-resistant cementitious blend, and a method of wellbore cementing using the carbonation-resistant concrete.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Geologic carbon sequestration (GCS) has been considered an efficient technique to capture $CO_2$ emitted by activities such as heavy industries and power plants into atmosphere [Li, B., et. al., Advances in Water Resources, 2013, 62, Part C, 488-498; Aminu, M. D., et. al., Applied Energy, 2017, 208, 1389-1419; and Pereira, L. M. C., et. al., Advances in Water Resources, 2017, 103, 64-75]. According to DECC (2012), by 2050 GCS projects alone could reduce $CO_2$ emissions by about 20%. In GCS technology, $CO_2$ captured from power plants and industrial sites is injected into suitable geological deep formations such as conventional reservoirs, depleted oil and gas reservoirs, saline deep aquifers, unmineable coal seams, and others [Abba, M. K., et. al., Journal of Natural Gas Science and Engineering, 2018, 60, 190-201; Omosebi, O., et. al., Journal of Natural Gas Science and Engineering, 2017, 44, 299-313; Ou, Y., et. al., International Journal of Greenhouse Gas Control, 2016, 44, 249-261; Yang, F., et. al., Applied Geochemistry, 2013, 30, 4-15; and Gilliland, E. S., et. al., International Journal of Coal Geology, 2013, 118, 105-112].

The integrity of reservoir formations and completed injection wells, especially the cement sheath, is the main factor determining the success of the GCS projects [Nasvi, M. C. M., et. al., Applied Energy, 2013, 102, 1391-1398; Shah, V., & Bishnoi, S., Construction and Building Materials, 2018, 178, 219-232; and Li, B., et. al., International Journal of Greenhouse Gas Control, 2018, 68, 276-286]. However, the integrity of the cement sheath and the durability of the cement is considerably reduced by the cement carbonation-induced degradation [Laumb, J. D., et. al., Energy Procedia, 2017 114, 5173-5181; and Wooyong, U. et. al., Greenhouse Gases: Science and Technology, 2017, 7, 852-865].

Oil well cement is typically composed of around 20% of Portlandite which has low resistance to corrosion under $CO_2$-rich conditions and can easily corrode under $CO_2$-rich environment. This results in a decrease in the compressive strength and an increase in the permeability of the cement sheath as well as the formation of microcracks inside the cement matrix [Kutchko, B. G., et. al., International Journal of Greenhouse Gas Control, 2011, 5, 880-888; and Wolterbeek, T. K. T. and Raoof, A., Environmental Science & Technology, 2018, 52, 3786-3795].

Several previous studies evaluated the effect of carbonation on cement integrity [Abid, K. et al., Journal of Natural Gas Science and Engineering, 2015, 27, 1149-1157; Mahmoud, A. A., et al., Paper SPE-192901-MS Presented at the 2018 Abu Dhabi International Petroleum Exhibition & Conference, Abu Dhabi, UAE, 12-15 November; and Mahmoud, A. A. and Elkatatny, S., Paper AADE-19-NTCE-066 Presented at the 2019 AADE National Technical Conference and Exhibition, Denver, Colo., USA, April 9-10]. The results of these studies showed that carbonation-induced degradation of cement could be mitigated using complementary additives in order to decrease the cement's hydration products of high pH and high Ca/Si content to prevent formation of portlandite, or to decrease the cement matrix permeability [Jacquemet, N., et. al., Applied Geochemistry, 2012, 27, 782-795; and Mahmoud, A. A., and Elkatatny, S., Journal of Natural Gas Science and Engineering, 2019, 68, 102902].

Fly ash and pozzolanic materials have been used effectively to decrease the Ca/Si ratio and portlandite content of cement. These materials, however, negatively affect the liquidity of the cement and the use of excessive concentrations of these additives increases the prevalence of microcracks [Aminu, M. D., et. al., Applied Energy, 2017, 208, 1389-1419; Bai, M., et. al., Renewable and Sustainable Energy Reviews, 2015, 45, 556-564; and Ilesanmi, O. R., et. al., SPE/IADC Middle East Drilling Technology Conference & Exhibition. Society of Petroleum Engineers, Dubai, 2014]. Pozzolanic materials also lead to formation of ettringite as a hydration product because of the high concentration of the $Al_2O_3$ in the pozzolans [Brandle, A., et. al., SPE Drilling & Completion, 2011, 26, 02, 208-219]. Other studies considered a decrease of the water-to-cement (w/c) ratio as a measure for decreasing the cement carbonation resistance, however the decrease in w/c ratio negatively affects the integrity of the cement matrix due to formation of microcracks [Barlet-Gouedard, V., et al., U.S. Pat. No. 8,091,642 B2].

Mahmoud and Elkatatny studied the effect of the nanoclay particles on the carbonation resistance of Saudi Class G cement [Mahmoud, A. A., and Elkatatny, S., Journal of Natural Gas Science and Engineering, 2019, 68, 102902]. It was reported that the addition of 1.0% by weight of cement (BWOC) of nanoclay particles considerably reduced the portlandite content of the hydrated cement and reduced its permeability compared to cement without nanoclay, i.e., the main mechanisms of the nanoclay to improve the cement carbonation resistance. The main problem of using nanoclay is its negative effect on the cement's rheological characteristics.

The carbonation-induced degradation resistance mechanisms and properties of amorphous-nanosilica-latex (ANL) modified cement was investigated by Xu et al. [Xu, B., et. al., Journal of Natural Gas Science and Engineering, 2019, 65, 237-247]. The results of this study showed that addition of the ANL converted portlandite to hydration products with low Ca/Si ratio which are more stable in a $CO_2$-rich environment compared with ordinary cement the cement incorporating ANL has low matrix permeability because of the filling effect of the nanosilica and the film formed by the latex.

Abid et al. compared the effect of nanosilica and agricultural wastes of rice husk ash (RHA) and palm oil fuel ash (POFA) on the carbonation resistance of Class G oil well cement [Abid, K., et. al., Journal of Natural Gas Science and Engineering, 2020, 73, 103062]. The results of this study showed that the agricultural wastes worked as retarders and delayed the compressive strength development. The cement matrix was not provided good carbonation resistance compared to nanosilica which significantly improved the cement compressive strength, and hence, considerably improved the cement carbonation resistance.

Thus, there remains a need to develop carbonation-resistant concretes and cementitious blends for use in wellbore cementing.

Accordingly, it is one object of the present disclosure to provide a carbonation-resistant cementitious blend, a concrete formed from such a blend, and a method of wellbore cementing using such a blend.

SUMMARY OF THE INVENTION

The present disclosure relates to a carbonation-resistant cementitious blend comprising cement, silica flour present in an amount of 30 to 40% by weight of cement (% BWOC), an expandable agent present in an amount of 0.4 to 2% BWOC, a dispersion agent present in an amount of 0.5 to 1.0% BWOC, a fluid loss additive present in an amount of 0.5 to 1.0% BWOC, a defoamer present in an amount of $1 \times 10^{-8}$ to $1 \times 10^{-6}$% BWOC, and an olive waste present in an amount of 0.01 to 0.75% BWOC.

In some embodiments, the olive waste comprises 60 to 75 atom % potassium, 7.5 to 11.5 atom % Ca, 7.5 to 11.5 atom % Cl, and 2 to 10 atom % Fe, with a balance being formed from at least one element selected from the group consisting of Al, Si, P, S, Mn, Ni, Cu, Zn, As, and Ba by X-ray fluorescence, based on a total number of atoms of X-ray fluorescence-active elements present in the olive waste.

In some embodiments, the olive waste comprises pulp, skin, and stone from the fruit of a plant from the genus *Olea*.

In some embodiments, the olive waste comprises crystalline sylvite, crystalline tridymite, and crystalline quartz by PXRD.

In some embodiments, the olive waste comprises by PXRD 50 to 87.5 wt % sylvite, 7.5 to 30 wt % tridymite, and 5 to 20 wt % quartz, based on a total weight of crystalline material present in the olive waste.

In some embodiments, the olive waste is present as particles having a median particle size ($D_{50}$) of 25 to 100 μm.

In some embodiments, the cement is Saudi Class G cement.

In some embodiments, the olive waste is substantially free of wood.

The present disclosure also relates to a carbonation-resistant concrete mix comprising water and the carbonation-resistant cementitious blend.

In some embodiments, the carbonation-resistant concrete mix has a water-to-cement weight ratio of 0.35 to 0.55.

The present disclosure also relates to a concrete formed from the carbonation-resistant concrete mix after hardening.

In some embodiments, the concrete has a tensile strength of 4.10 to 4.95 MPa after contacting a solution of $CO_2$-saturated brine at 130° C. and 1500 PSI for 20 days.

In some embodiments, the concrete has a tensile strength after contacting a solution of $CO_2$-saturated brine at 130° C. and 1500 PSI for 20 days which is 90.0 to 99.0% of a tensile strength of a corresponding concrete which lacks the olive waste subjected to the contacting.

In some embodiments, the concrete has a compressive strength of 95 to 105 MPa after contacting a solution of $CO_2$-saturated brine at 130° C. and 1500 PSI for 20 days, the compressive strength measured according to API RP 10B.

In some embodiments, the concrete has a compressive strength after contacting a solution of $CO_2$-saturated brine at 130° C. and 1500 PSI for 20 days which is 92.5 to 99.9% of a compressive strength of a corresponding concrete which lacks the olive waste subjected to the contacting, the compressive strength measured according to API RP 10B.

In some embodiments, the concrete has a mean carbonation rate of 85 to 115 μm/day over 20 days contacting a solution of $CO_2$-saturated brine at 130° C. and 1500 PSI.

In some embodiments, the concrete has a mean carbonation rate day over 20 days contacting a solution of $CO_2$-saturated brine at 130° C. and 1500 PSI which is 70 to 90% of a mean carbonation rate of a corresponding concrete which lacks the olive waste subjected to the contacting.

In some embodiments, the concrete has a permeability of 0.0030 to 0.0044 mD after contacting a solution of $CO_2$-saturated brine at 130° C. and 1500 PSI for 10 days.

In some embodiments, the concrete has a permeability after contacting a solution of $CO_2$-saturated brine at 130° C. and 1500 PSI for 10 days which is 65 to 90% of a permeability of a corresponding concrete which lacks the olive waste subjected to the contacting.

The present disclosure also relates to a method of cementing a portion of a wellbore, the method comprising introducing the carbonation-resistant concrete mix into the portion of the wellbore and allowing the carbonation-resistant concrete mix to cure thereby forming a wellbore cement.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE INVENTION

In the following description, it is understood that other embodiments may be utilized and structural and operational changes may be made without departure from the scope of the present embodiments disclosed herein.

Definitions

As used herein the words "a" and "an" and the like carry the meaning of "one or more."

As used herein, the terms "optional" or "optionally" means that the subsequently described event(s) can or cannot occur or the subsequently described component(s) may or may not be present (e.g., 0 wt. %).

The phrase "substantially free", unless otherwise specified, describes a particular component being present in an amount of less than about 1 wt. %, preferably less than about 0.5 wt. %, more preferably less than about 0.1 wt. %, even more preferably less than about 0.05 wt. %, yet even more preferably 0 wt. %, relative to a total weight of the composition being discussed.

According to a first aspect, the present disclosure relates to a carbonation-resistant cementitious blend comprising cement, silica flour, an expandable agent, a dispersion agent, a fluid loss additive, a defoamer, and an olive waste.

In one embodiment, the cement used herein may include hydraulic cement, non-hydraulic cement, or a combination thereof. In a preferred embodiment, the cement is hydraulic cement. The cement may comprise Portland cement, a basic ingredient of concrete, mortar, stucco, and/or non-specialty grout, which is present as a fine powder, and produced by heating limestone and clay materials in a kiln to form clinker, grinding the clinker, and adding small amounts of other materials. Exemplary Portland cement includes, without limitation, ordinary Portland cement (OPC) type I, type II, type III, type IV, type V, and a combination thereof (in accordance with either ASTM C 150 or European EN-197 standard). Portland cement type IA, type IIA, and/or type IIIA may also be used, which have the same composition as type I, II, and III except that an air-entraining agent is ground into the mix (also in accord with the ASTM C 150 standard).

Additional cement types include hydraulic cements, Saudi Class G hydraulic cement, non-hydraulic cements, Portland fly ash cement, Portland Pozzolan cement, Portland silica fume cement, masonry cements, EMC cements, stuccos, plastic cements, expansive cements, white blended cements, Pozzolan-lime cements, slag-lime cements, supersulfated cements, calcium aluminate cements, calcium sulfoaluminate cements, geopolymer cements, Rosendale cements, polymer cement mortar, lime mortar, and/or pozzolana mortar.

Typically, hydraulic cements, particularly Portland cements, are used to cement the well casing within the wellbore. Hydraulic cements set and develop compressive strength due to the occurrence of a hydration reaction which allows them to set or cure under water. The physical properties of the set cement relate to the crystalline structure of the calcium-silicate-hydrates formed during hydration. For example, conventional Portland cements form an interlocking crystalline network of, for example, tricalcium silicate, dicalcium silicate, tetracalcium aluminum ferrite and calcium hydroxide crystals. These crystals interconnect to form an interlocking crystalline structure which provides both flexural strength and a degree of resiliency. Hydration products of Portland cements may also form crystalline or amorphous interlocking networks of the hydration products calcium silicate hydrate (CSH, or C—S—H), calcium hydroxide (CH, or Portlandite), calcium silicate (Larnite), aluminum calcium iron oxide (such as $Ca_2FeAlO_5$), and/or silicon dioxide.

The term "hydraulic cement" refers to any inorganic cement that hardens or sets due to hydration. Hydraulic cements, for instance, include Portland cements, aluminous cements, pozzolan cements, fly ash cements, and the like. Thus, for example, any of the oil well type cements of the class "A-H" as listed in the API Spec 10, (1st ed., 1982), are suitable hydraulic cements. In one or more embodiments, the hydraulic cement is selected from the group consisting of Saudi Class G hydraulic cement, API Class A Portland cement, API Class C Portland cement, API Class G Portland cement, and API Class H Portland cement. In a preferred embodiment, the hydraulic cement is Saudi Class G hydraulic cement.

In some embodiments, the carbonation-resistant cementitious blend is substantially free of sand. In some embodiments, the carbonation-resistant cementitious blend is substantially free of siliceous loam. In some embodiments, the carbonation-resistant cementitious blend is substantially free of pozzolans. In some embodiments, the carbonation-resistant cementitious blend is substantially free of diatomaceous earth. In some embodiments, the carbonation-resistant cementitious blend is substantially free of iron pyrites. In some embodiments, the carbonation-resistant cementitious blend is substantially free of alumina.

A pozzolan is a siliceous or siliceous and aluminous material that in itself possesses little or no cementitious value but will, in finely divided form and in the presence of moisture, chemically react with calcium hydroxide at ordinary temperatures to form compounds having cementitious properties. It is therefore classified as cementitious material. There are both natural (see ACI 232.1R) and artificial (e.g., fly ash, see ACI 232.2R, and silica fume, see ACI 234R) pozzolans [ACI PRC-232.1-12 Report on the Use of Raw or Processed Natural Pozzolans in Concrete, American Concrete Institute, 2012; ACI 232.2R Report on the Use of Fly Ash in Concrete, American Concrete Institute, 2018; and ACI 234R Guide for the Use of Silica Fume in Concrete, American Concrete Institute, 2012, each of which is incorporated by reference herein in its entirety]. Descriptions of various kinds of pozzolans and specifications for them are given in ASTM C618 and ASTM C1240. In some embodiments, the carbonation-resistant cementitious blend is substantially free of natural pozzolans. As used herein, natural pozzolans are siliceous or aluminosiliceous materials such as volcanic ashes, calcined clays, and shale. Pozzolans react chemically with alkali hydroxide such as, but not limited to alkali metal or alkaline earth metal calcium hydroxides to form compounds such as metal silicate hydrates possessing cementitious properties. Natural pozzolans include those described in co-pending U.S. patent application Ser. No. 16/290,314 ('314)—incorporated herein by reference in its entirety. Natural pozzolan is available in many parts of the world, including a 100,000 $km^2$ area in Saudi Arabia along the Red Sea coast [M. R. Moufti, A. A. Sabtan, O. R. El-Mahdy and W. M. Shehata, "Preliminary Geologic and Engineering Assessment of the Pyroclastic Deposits in the Central Part of Harrat Rahat," Journal of King Abdul Aziz University, Earth Sciences, Vol. 11. pp. 59-88, 1999, incorporated herein by reference in its entirety].

Diatomaceous earth is a naturally occurring, soft, siliceous sedimentary rock that can be crumbled into a fine white to off-white powder. It has a particle size ranging from more than 3 µm to less than 1 mm, but typically 10 to 200 µm. Depending on the granularity, this powder can have an abrasive feel, similar to pumice powder, and has a low density as a result of its high porosity. The typical chemical composition of oven-dried diatomaceous earth is 80-90% silica, with 2-4% alumina (attributed mostly to clay minerals), and 0.5-2% iron oxide. Diatomaceous earth consists of the fossilized remains of diatoms, a type of hard-shelled microalgae.

Silica flour is crystalline silica which may be produced by grinding silica sand. The particle size of silica flour is generally in the range of 20 50 µm, preferably in the range of 25-45 µm, or 30-40 µm. The silica flour is present in an amount of 30 to 40% by weight of cement (% BWOC), preferably 30.5 to 39.5% BWOC, preferably 31 to 39% BWOC, preferably 31.5 to 38.5% BWOC, preferably 32 to 38% BWOC, preferably 32.5 to 37.5% BWOC, preferably 33 to 37% BWOC, preferably 33.5 to 36.5% BWOC, preferably 34 to 36% BWOC, preferably 34.25 to 35.75% BWOC, preferably 34.5 to 35.5% BWOC, preferably 34.75 to 35.25% BWOC, preferably 35% BWOC.

Conventional cement may shrink and cause cracks during the curing steps. Expandable agents, or expanding agent, may be used to promote cement bonding capability and help maintain concrete integrity. Exemplary expandable agents include, but are not limited to, sulphoaluminates such as UEA, calcium oxide, and other expansion admixtures. In a preferred embodiment, the expandable agent is Halliburton's Microbond HT® Expanding Additive. The expandable agent is present in an amount of 0.4% BWOC to 2% BWOC, preferably 0.6% BWOC to 1.8% BWOC, preferably 0.7% BWOC to 1.5% BWOC, preferably 0.9% BWOC to 1.1% BWOC, or about 1% BWOC.

Dispersion agents, also known as friction reducers, dispersants, thinners, or turbulence inducers, are used mainly to control cement slurry rheological properties for better mixing and pumping. They may reduce friction between cement slurry particles, resulting in a lower pumping pressure requirement, and also reducing water-to-cement ratio, which may improve cement compressive strength. Exemplary dispersion agents include, but are not limited to, calcium lignosulfonate, sodium lignosulfonate, naphthalene sulfonates, polynaphthalenesulfonates, phenol sulfonates, phosphates, phosphonates, sulfonated styrene maleic anhydride, sulfonated styrene, maleimide, polyacrylates, polymethacrylates, and hydroxycarboxylic acids (e.g. citric acid). The dispersion agent present in an amount of 0.5 to 1.0% BWOC, preferably 0.55 to 0.95% BWOC, preferably 0.6 to 0.9% BWOC, preferably 0.65 to 0.875% BWOC, preferably 0.7 to 0.85% BWOC, preferably 0.75 to 0.825% BWOC, preferably 0.80% BWOC.

Fluid loss additives, or fluid loss control agents, are used to control the rate at which a cement slurry or concrete mix loses water and to maintain it within the acceptable industry standards. Controlling fluid loss rate is an important issue to be considered when cementing across permeable formations, where it could be damaged by the cement slurry filtrate. Exemplary fluid loss additives include, but are not limited to, guar gums and derivatives, welan gum, xanthan gum, poly(ethyleneimine), AMPS polymer (i.e. poly(2-acrylamido-2-methyl-1-propanesulfonic acid), cellulose and derivatives such as carboxymethyl hydroxyethyl cellulose, carboxymethyl cellulose, and hydroxyethyl cellulose, and polystyrene sulfonate. In one embodiment, the fluid loss additive is Halliburton's HALAD-344 fluid loss additive. The fluid loss additive is present in an amount of 0.5 to 1.0% BWOC, preferably 0.55 to 0.95% BWOC, preferably 0.6 to 0.9% BWOC, preferably 0.625 to 0.85% BWOC, preferably 0.65 to 0.8% BWOC, preferably 0.675 to 0.75% BWOC, preferably 0.70% BWOC.

Defoamers are anti-foaming agents used to minimize air entrainment (e.g. frothing, foaming) that often occurs during cement slurry mixing process. The entrapped air in the cement slurry may cause damages to the pumps in the field, and may also cause incorrect density of cement slurry. Exemplary defoamers include, but are not limited to, silicone based defoamers, polyethylene glycol and polypropylene glycol copolymers based defoamers, and oil-based defoamers, alkyl polyacrylates and polyether polymer. In one embodiment, the defoamer used herein is D-Air 4000L defoamer. The defoamer is present in an amount of $1\times10^{-8}$% BWOC to $1\times10^{-6}$% BWOC, preferably $5\times10^{-8}$% BWOC to $8\times10^{-7}$% BWOC, preferably $1\times10^{-7}$% BWOC to $6\times10^{-7}$% BWOC, preferably $2\times10^{-7}$% BWOC to $5\times10^{-7}$% BWOC, preferably $4.7\times10^{-7}$% BWOC.

In some embodiments, the olive waste comprises 60 to 75 atom %, preferably 61 to 74.5 atom %, preferably 62 to 74 atom %, preferably 63 to 73.5 atom %, preferably 64 to 72 atom %, preferably 65 to 71.5 atom %, preferably 66 to 71 atom %, preferably 67 to 70.5 atom %, preferably 68 to 70 atom %, preferably 68.5 to 69.5 atom %, preferably 68.75 to 69.25 atom % potassium, 7.5 to 11.5 atom %, preferably 7.75 to 11.25 atom %, preferably 8.0 to 11.0 atom %, preferably 8.25 to 10.75 atom %, preferably 8.5 to 10.5 atom %, preferably 8.75 to 10.25 atom %, preferably 9 to 10 atom %, preferably 9.25 to 9.75 atom %, preferably 9.5 atom % Ca, 7.5 to 11.5 atom %, preferably 7.75 to 11.25 atom %, preferably 8.0 to 11.0 atom %, preferably 8.25 to 10.75 atom %, preferably 8.5 to 10.5 atom %, preferably 8.75 to 10.25 atom %, preferably 9 to 10 atom %, preferably 9.25 to 9.75 atom % Cl, and 2 to 10 atom %, preferably 3 to 9 atom %, preferably 4 to 8 atom %, preferably 4.5 to 7.5 atom %, preferably 5 to 7 atom %, preferably 5.5 to 6.5 atom %, preferably 6 to 6.25 atom % Fe, with a balance being formed from at least one element selected from the group consisting of Al, Si, P, S, Mn, Ni, Cu, Zn, As, and Ba by X-ray fluorescence, based on a total number of atoms of X-ray fluorescence-active elements present in the olive waste. In some embodiments, the olive waste comprises pulp, skin, and stone from the fruit of a plant from the genus *Olea*. Examples of plants from the genus *Olea* include, but are not limited to *Olea ambrensis, Olea borneensis, Olea brachiate, Olea capensis, Olea capitellata, Olea caudatilimba, Olea Chimanimani, Olea cordatula, Olea dioica, Olea europaea, Olea exasperate, Olea gagnepainii, Olea gamblei, Olea hainanensis, Olea javanica, Olea lancea, Olea laxiflora, Olea moluccensis, Olea neriifolia, Olea palawanensis, Olea paniculata, Olea parvilimba, Olea polygama, Olea puberula, Olea rosea, Olea rubrovenia, Olea salicifolia, Olea schiebenii, Olea tetragonoclada, Olea tsoongii, Olea welwitschii, Olea wightiana, Olea woodiana,* and *Olea yuennanensis*. In preferred embodiments, the plant from the genus *Olea* is *Olea europaea*, also known as the European olive.

The olive waste may be the byproduct of olive oil extraction or production. Such extraction or production may involve the grinding or milling of olives. Such grinding or milling may be performed by any suitable technique or with any suitable equipment known to one of ordinary skill in the art. Examples of such techniques include, but are not limited to, grinding, ball milling, chopping, pulverizing, crushing, pounding, mincing, shredding, smashing, and fragmenting. In some embodiments, the reducing to small particles may take place using a mill, ball mill, rod mill, autogenous mill, cutting mill, semi-autogenous grinding mill, pebble mill, buhrstone mill, burr mill, tower mill, vertical shaft impactor mill, a low energy milling machine, grinder, pulverizer, mortar and pestle, blender, crusher, or other implement used to reduce a material to small particles. The extraction or production may involve heating. Such heating is typically to temperatures less than 200° F., preferably less than 175° F., preferably less than 150° F., preferably less than 125° F., preferably less than 100° F., preferably less than 80° F. In some embodiments, the extraction or production involves heating to temperatures greater than 200° F. In some embodiments, the extraction or production does not involve heating.

In some embodiments, the olive waste comprises crystalline sylvite, crystalline tridymite, and crystalline quartz by PXRD. In some embodiments, the olive waste comprises by PXRD 50 to 87.5 wt %, preferably 52 to 85.5 wt %, preferably 54 to 83.5 wt %, preferably 56 to 81.5 wt %, preferably 58 to 79.5 wt %, preferably 60 to 77.5 wt %, preferably 62 to 76.5 wt %, preferably 63 to 75.5 wt %, preferably 64 to 74.5 wt %, preferably 65 to 73.5 wt %, preferably 66 to 72.5 wt % preferably 67 to 71.5 wt %, preferably 67.5 to 71 wt %, preferably 68 to 70.5 wt %, preferably 68.5 to 70 wt % preferably 69 to 69.5 wt % sylvite, 7.5 to 30 wt %, preferably 8 to 29 wt %, preferably 9 to 28 wt %, preferably 10 to 27 wt %, preferably 11 to 26 wt %, 12 to 25 wt %, preferably 13 to 24 wt %, preferably 14 to 23 wt %, preferably 15 to 22 wt %, preferably 16 to 21 wt %, preferably 17 to 20 wt %, preferably 17.5 to 19.5 wt %, preferably 18 to 19 wt %, preferably 18.5 wt % tridymite, and 5 to 20 wt %, preferably 6 to 19 wt %, preferably 7 to 18 wt %, preferably 8 to 17 wt %, preferably 9 to 16 wt %, preferably 10 to 15 wt %, preferably 10.5 to 14 wt %, preferably 11 to 13.5 wt %, preferably 11.5 to 13 wt %, preferably 12 to 12.5 wt % quartz, based on a total weight of crystalline material present in the olive waste. In some embodiments, the olive waste is substantially free of wood.

In some embodiments, the olive waste is present as particles. In general, the particles can be any shape known to one of ordinary skill in the art. Examples of suitable shapes the particles may take include spheres, spheroids, lentoids, ovoids, solid polyhedra such as tetrahedra, cubes, octahedra, icosahedra, dodecahedra, hollow polyhedra, stellated polyhedra (both regular and irregular), triangular prisms, hollow spherical shells, plates, sheets, discs, rods, and mixtures thereof. In some embodiments, the particles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of particles having a different shape. As used herein, the term "non-uniform shape" refers to an average consistent shape that differs by more than 10% of the distribution of particles having a different shape. In some embodiments, the particles have a median particle size ($D_{50}$) of 25 to 100 μm, preferably 30 to 90 μm, preferably 35 to 80 μm, preferably 40 to 70 μm, preferably 45 to 65 μm, preferably 50 to 60 μm, preferably 55 to 57.5 μm. In embodiments where the particles are spherical, the particle size may refer to a particle diameter. In embodiments where the particles are polyhedral, the particle size may refer to the diameter of a circumsphere. In some embodiments, the particle size refers to a mean distance from a particle surface to particle centroid or center of mass. In alternative embodiments, the particle size refers to a maximum distance from a particle surface to a particle centroid or center of mass. In some embodiments where the particles have an anisotropic shape such as rods, the particle size may refer to a length of the rod, a width of the rod, an average of the length and width of the rod. In some embodiments in which the particles have non-spherical shapes, the particle size refers to the diameter of a sphere having an equivalent volume as the particle. In some embodiments in which the particles have non-spherical shapes, the particle size refers to the diameter of a sphere having an equivalent diffusion coefficient as the particle. In general, the particle size may be determined by any suitable method known to one of ordinary skill in the art. In some embodiments, the particle size is determined by powder X-ray diffraction (PXRD). Using PXRD, the particle size may be determined using the Scherrer equation, which relates the full-width at half-maximum (FWHM) of diffraction peaks to the size of regions comprised of a single crystalline domain (known as crystallites) in the sample. In some embodiments, the crystallite size is the same as the particle size. For accurate particle size measurement by PXRD, the particles should be crystalline, comprise only a single crystal, and lack non-crystalline portions. Typically, the crystallite size underestimates particle size compared to other measures due to factors such as amorphous regions of particles, the inclusion of non-crystalline material on the surface of particles such as bulky surface ligands, and particles which may be composed of multiple crystalline domains. In some embodiments, the particle size is determined by dynamic light scattering (DLS). DLS is a technique which uses the time-dependent fluctuations in light scattered by particles in suspension or solution in a solvent, typically water to measure a size distribution of the particles. Due to the details of the DLS setup, the technique measures a hydrodynamic diameter of the particles, which is the diameter of a sphere with an equivalent diffusion coefficient as the particles. The hydrodynamic diameter may include factors not accounted for by other methods such as non-crystalline material on the surface of particles such as bulky surface ligands, amorphous regions of particles, and surface ligand-solvent interactions. Further, the hydrodynamic diameter may not accurately account for non-spherical particle shapes. DLS does have an advantage of being able to account for or more accurately model solution or suspension behavior of the particles compared to other techniques. In some embodiments, the particle size is determined by electron microscopy techniques such as scanning electron microscopy (SEM) or transmission electron microscopy (TEM).

The olive waste is present in an amount of 0.01 to 0.75% BWOC, preferably 0.025 to 0.6% BWOC, preferably 0.05 to 0.5% BWOC, preferably 0.09 to 0.4% BWOC, preferably 0.1 to 0.3% BWOC.

In some embodiments, the carbonation-resistant cementitious blend comprises a plasticizer. As used herein, a "plasticizer" is an additive that increases the plasticity or fluidity of slurry. Plasticizers increase the workability of "fresh" concrete, allowing it to be placed more easily, with less consolidating effort. A superplasticizer is a plasticizer with fewer deleterious effects. A "superplasticizer" refers a chemical admixture used herein to provide a well-dispersed particle suspension in the wet concrete slurry. The superplasticizer may be used to prevent particle segregation and to improve the flow characteristics of the wet concrete slurry. The addition of a superplasticizer during transit of concrete mortar and mix is a fairly new development within the industry. Admixtures added in transit through automated slump management systems allow concrete producers to maintain slump until discharge without reducing concrete quality. The superplasticizer may be a polycarboxylate, e.g. a polycarboxylate derivative with polyethylene oxide side chains, a polycarboxylate ether (PCE) superplasticizer, such as the commercially available Glenium 51®. Polycarboxylate ether-based superplasticizers may allow a significant water reduction at a relatively low dosage, thereby providing good particle dispersion in the wet concrete slurry. Polycarboxylate ether-based superplasticizers are composed of a methoxy-polyethylene glycol copolymer (side chain)

grafted with methacrylic acid copolymer (main chain). Exemplary superplasticizers that may be used in addition to, or in lieu of a polycarboxylate ether based superplasticizer include, but are not limited to, alkyl citrates, sulfonated naphthalene, sulfonated alene, sulfonated melamine, lignosulfonates, calcium lignosulfonate, naphthalene lignosulfonate, polynaphthalenesulfonates, formaldehyde, sulfonated naphthalene formaldehyde condensate, acetone formaldehyde condensate, polymelaminesulfonates, sulfonated melamine formaldehyde condensate, polycarbonate, other polycarboxylates, other polycarboxylate derivatives comprising polyethylene oxide side chains, and the like and mixtures thereof. In some embodiments, the carbonation-resistant cementitious blend is substantially free of plasticizers.

The present disclosure also relates to a carbonation-resistant concrete mix comprising water and the carbonation-resistant cementitious blend. A concrete mix may be referred to as a "cement slurry". The water may be potable water, tap water, freshwater or seawater, and may be taken from a natural source, such as an aquifer, lake, or ocean, and may be filtered to remove large solids before using. A brine, which is an aqueous mixture of one or more soluble salts (e.g. sodium chloride, potassium chloride, calcium chloride, calcium bromide, sodium bromide, potassium bromide, zinc bromide), may be used as water. Seawater or water from a salt lake may be considered a brine.

In some embodiments, the carbonation-resistant concrete mix has a water-to-cement weight ratio of 0.35 to 0.55, preferably 0.36 to 0.53, preferably 0.37 to 0.51, preferably 0.38 to 0.50, preferably 0.39 to 0.49, preferably 0.40 to 0.48, preferably 0.41 to 0.47, preferably 0.42 to 0.46, preferably 0.43 to 0.45, preferably 0.44. In general, the amount of water used in the wet cement slurry depends upon the type of hydraulic cement selected and the job conditions at hand. The amount of water used may vary over a wide range, depending upon factors such as the chemical identity of the cement and the required consistency of the wet cement slurry.

The present disclosure also relates to a concrete formed from the carbonation-resistant concrete mix after hardening.

The concrete may be made by sequentially pouring different components into a concrete mixer (e.g. a paddle mixer, a drum mixer, a rotating mixer). For example, the aforementioned cementitious blend including the cement, the silica flour, and the olive waste are dry-mixed in a concrete mixer for a time period ranging from 30 seconds to 30 minutes, 60 seconds to 20 minutes, or 5 to 10 minutes. Preferably, mixing the cement, the silica flour, and the olive waste forms a homogeneous dry mixture.

In some embodiments, following the dry mixing process, water may be added to the dry mixture to form a wet cement slurry. The water is slowly poured into the concrete mixer while the concrete mixer turns the dry mixture for a time period ranging from 1 to 10 minutes, 2 to 8 minutes, or 3 to 6 minutes thereby forming a wet cement mixture. Preferably, the water is mixed into the dry mixture for a time period of 1 to 30 minutes, 2 to 10 minutes, or about 5 minutes. After a thorough mixing, additives such as the dispersion agent, the defoamer, and the fluid loss additive may be slowly poured into the concrete mixer, and the wet cement mixture is further mixed for a time period of 1 to 10 minutes, 2 to 8 minutes, or 3 to 6 minutes thereby forming the wet cement slurry. Alternatively, the additives such as the dispersion agent, the defoamer, and the fluid loss additive may be added before the water.

The wet cement slurry containing the cement, the silica flour, the olive waste, water, dispersion agent, defoamer, and fluid loss additive may be then casted into a mold thereby forming a casted wet cement. The wet cement slurry may be compacted in the mold by using a steel rod or a trowel. In one embodiment, the casted wet cement may be cured at a temperature of 10 to 400° C., preferably 38 to 300° C., preferably 60 to 200° C., preferably 95 to 150° C. for a time period of 0.1 to 7 days, 0.5 to 5 days, or 1 to 3 days and then removed from the mold, which results in a concrete.

The concrete may be left to further cure for a length of time necessary to achieve a desired mechanical property, such as a desired compressive strength. Preferably the concrete, left to cure, will harden with a mechanical strength (e.g. compressive or tensile strength) that increases over the curing time. However, a strength will reach a maximum value within a certain time of curing, for example, within 30 days. In one embodiment, the concrete may be left to further cure for a time period of 1 to 30 days, preferably 5 to 28 days, more preferably 14 to 21 days, though in certain embodiments, the cement may be considered cured in less than 1 day or after 30 days. The concrete may be further cured at a temperature of 10 to 400° C., preferably 38 to 300° C., preferably 6 to 200° C., preferably 95 to 150° C. Methods of preparing and curing wet cement slurries are generally known to those skilled in the art.

As defined herein, compressive strength is the capacity of a material or structure to withstand compressive loads, as opposed to tensile strength, which is the capacity of a material or structure to withstand tensile loads.

In some embodiments, the concrete has a tensile strength of 4.10 to 4.95 MPa, preferably 4.15 to 4.85 MPa, preferably 4.20 to 4.75 MPa, preferably 4.25 to 4.65 MPa, preferably 4.30 to 4.60 MPa, preferably 4.35 to 4.575 MPa, preferably 4.375 to 5.55 MPa, preferably 4.40 to 4.525 MPa, preferably 4.425 to 4.50 MPa, preferably 4.45 to 4.49 MPa, preferably 4.46 to 4.47 MPa after contacting a solution of $CO_2$-saturated brine at 130° C. and 1500 PSI for 20 days.

In some embodiments, the concrete has a tensile strength after contacting a solution of $CO_2$-saturated brine at 130° C. and 1500 PSI for 20 days which is 90.0 to 99.0%, preferably 91 to 98.75%, preferably 92.0 to 98.5%, preferably 93.0 to 98.25%, preferably 94.0 to 98.0%, preferably 95.0 to 97.75%, preferably 96.0 to 97.6, preferably 97.0 to 97.5%, preferably 97.2 to 97.4 of a tensile strength of a corresponding concrete which lacks the olive waste subjected to the contacting.

In some embodiments, the concrete has a compressive strength of 95 to 105 MPa, preferably 95.5 to 104 MPa, preferably 96 to 103 MPa, preferably 96.5 to 102.5 MPa, preferably 97.0 to 102 MPa, preferably 97.5 to 101.5 MPa, preferably 98.0 to 101.0 MPa, preferably 98.25 to 100.75 MPa, preferably 98.5 to 100.5 MPa, preferably 98.75 to 100.25 MPa, preferably 98.8 to 100.2 MPa after contacting a solution of $CO_2$-saturated brine at 130° C. and 1500 PSI for 20 days.

In some embodiments, the concrete has a compressive strength after contacting a solution of $CO_2$-saturated brine at 130° C. and 1500 PSI for 20 days which is 92.5 to 99.9%, preferably 92.75 to 99.75%, preferably 93.0 to 99.5%, preferably 93.25 to 99.25%, preferably 93.5 to 99.0%, preferably 93.75 to 98.75%, preferably 94.0 to 98.5%, preferably 94.1 to 98.0% of a compressive strength of a corresponding concrete which lacks the olive waste subjected to the contacting.

In some embodiments, the concrete has a mean carbonation rate of 85 to 115 μm/day, preferably 86 to 113 μm/day, preferably 87 to 112 μm/day, preferably 88 to 111 μm/day, preferably 89 to 110 μm/day, preferably 90 to 109 μm/day, preferably 91 to 108 μm/day, preferably 92 to 107 μm/day, preferably 93 to 106 μm/day, preferably 94 to 105 μm/day, preferably 93 to 104 μm/day, preferably 94 to 103 μm/day, preferably 95 to 102 μm/day, preferably 96 to 101 μm/day over 20 days contacting a solution of $CO_2$-saturated brine at 130° C. and 1500 PSI.

In some embodiments, the concrete has a mean carbonation rate day over 20 days contacting a solution of $CO_2$-saturated brine at 130° C. and 1500 PSI which is 70 to 90%, preferably 72 to 89%, preferably 74 to 88%, preferably 75 to 86%, preferably 76 to 85%, preferably 77 to 84%, preferably 78 to 83%, preferably 79 to 82%, preferably 80 to 81% of a mean carbonation rate of a corresponding concrete which lacks the olive waste subjected to the contacting.

In some embodiments, the concrete has a permeability of 0.0030 to 0.0044 mD, preferably 0.0031 to 0.0043 mD, preferably 0.0032 to 0.0042 mD, preferably 0.0033 to 0.0041 mD, preferably 0.0034 to 0.0039 mD after contacting a solution of $CO_2$-saturated brine at 130° C. and 1500 PSI for 10 days.

In some embodiments, the concrete has a permeability after contacting a solution of $CO_2$-saturated brine at 130° C. and 1500 PSI for 10 days which is 65 to 90%, preferably 67 to 88%, preferably 69 to 86%, preferably 70 to 84%, preferably 71 to 82%, preferably 72 to 80%, preferably 73 to 78%, preferably 74 to 77%, preferably 74.5 to 77%, preferably 75 to 76%, preferably 75.5 to 75.75% of a permeability of a corresponding concrete which lacks the olive waste subjected to the contacting.

The present disclosure also relates to a method of cementing a portion of a wellbore, the method comprising introducing the carbonation-resistant concrete mix into the portion of the wellbore and allowing the carbonation-resistant concrete mix to cure thereby forming a wellbore cement.

The concrete mix containing the cementitious blend may be used in wellbore cementing operations such as primary cementing where strings of pipe (e.g. casings and liners) are cemented in wellbores. In one embodiment, the wet cement slurry is introduced into and cured within an annulus existing between a pipe and a formation of a wellbore, thus producing a cured cement material (i.e. wellbore cement) between the pipe and the formation of the wellbore. The wellbore cement may physically support and position the pipe within the wellbore and prevent undesirable migration of fluids between formations of the wellbore.

In one or more embodiments, the wellbore is at least one selected from the group consisting of a horizontal wellbore, a vertical wellbore, and a multi-lateral wellbore. As used here, a "vertical wellbore" is a wellbore that has a vertical section, which is substantially perpendicular to a surface of the ground. As used here, a "horizontal wellbore" refers to a wellbore that has a vertical section and a horizontal lateral section with an inclination angle (an angle between the vertical section and the horizontal lateral section) of at least 70°, or at least 80°, or in a range of 85° to 90°. The horizontal wellbore may enhance a reservoir performance due to an increased reservoir contact provided by the horizontal lateral section. As used here, a "multi-lateral wellbore" refers to a wellbore that has a main/central borehole and a plurality of laterals extend outwardly therefrom.

The method of the present disclosure is applicable to HPHT (high-pressure high-temperature) wellbores. In one or more embodiments, the wellbore has a temperature in in a range of 25 to 400° C., preferably 50 to 350° C., preferably 75 to 300° C., preferably 95 to 250° C., preferably 100 to 200° C., preferably 125 to 175° C., preferably 150 to 160° C. In a related embodiment, the wellbore has a pressure in a range of 0.1 to 20 MPa, preferably 0.5 to 18 MPa, preferably 1 to 16 MPa, preferably 2 to 14 MPa, preferably 5 to 12 MPa, preferably 8 to 10 MPa. However, the present method may be applicable to wellbores having a temperature of less than 25° C. or greater than 400° C., or a pressure of less than 0.1 MPa or greater than 20 MPa.

In one or more embodiments, the method further involves exposing the wellbore cement to steam injection with a temperature of 200 to 400° C., preferably 250 to 350° C., or about 300° C. In a preferred embodiment, the wellbore is a steam injection wellbore, or a high-pressure high-temperature wellbore.

In one embodiment, the cured wellbore cement may be further exposed to $CO_2$. In a related embodiment, the curing of the wellbore cement is performed in the presence of $CO_2$. $CO_2$ may be present in an aqueous medium in a wellbore at saturated concentrations, or at a concentration in a range of 0.001 to 10 M, 0.01 to 8 M, 0.1 to 6 M, 0.2 to 4 M, 0.4 to 2 M, or 0.5 to 1 M. The wellbore cement disclosed by the present method tolerates the presence of $CO_2$ in a wellbore. In a preferred embodiment, the wellbore is a $CO_2$ injection wellbore, or a $CO_2$ sequestration wellbore.

As used herein, brine is an aqueous mixture of one or more soluble salts (e.g. sodium chloride, potassium chloride, calcium chloride, calcium bromide, sodium bromide, potassium bromide, zinc bromide, magnesium chloride). Seawater or water from a salt lake may be considered a brine. In one embodiment, the cured wellbore cement may be further exposed to a brine. In a related embodiment, the curing of the wellbore cement is performed in the presence of a brine. For example, the brine may contain 0.1 to 10 wt %, 0.5 to 8 wt %, or 1 to 5 wt % sodium chloride (NaCl) relative to a total weight of the brine. The brine may further contain 0.1 to 0.8 wt %, 0.15 to 0.6 wt %, or 0.2 to 0.4 wt % calcium chloride, as well as 0.05 to 0.7 wt %, 0.1 to 0.5 wt %, or 0.15 to 0.25 wt % magnesium chloride, each relative to a total weight of the brine. In certain embodiments, the method involves exposing the wellbore cement to $CO_2$ present at saturated concentrations in the saline.

In a related embodiment, after exposing the wellbore cement to $CO_2$, saline, or both for 0.1 to 35 days, 1 to 30 days, 5 to 28 days, 7 to 25 days, or 10 to 22 days, the wellbore cement has a compressive strength which is 92.5 to 99.9%, preferably 92.75 to 99.75%, preferably 93.0 to 99.5%, preferably 93.25 to 99.25%, preferably 93.5 to 99.0%, preferably 93.75 to 98.75%, preferably 94.0 to 98.5%, preferably 94.1 to 98.0% of a compressive strength of a corresponding concrete which lacks the olive waste.

In another related embodiment, after exposing the wellbore cement to $CO_2$, saline, or both for 0.1 to 35 days, 1 to 30 days, 5 to 28 days, 7 to 25 days, or 10 to 22 days, the wellbore cement has a tensile strength which is 90.0 to 99.0%, preferably 91 to 98.75%, preferably 92.0 to 98.5%, preferably 93.0 to 98.25%, preferably 94.0 to 98.0%, preferably 95.0 to 97.75%, preferably 96.0 to 97.6, preferably 97.0 to 97.5%, preferably 97.2 to 97.4 of a tensile strength of a corresponding concrete which lacks the olive waste.

In another related embodiment, after exposing the wellbore cement to $CO_2$, saline, or both for 0.1 to 35 days, 1 to 30 days, 5 to 28 days, 7 to 25 days, or 10 to 22 days, the wellbore cement has a which is 65 to 90%, preferably 67 to 88%, preferably 69 to 86%, preferably 70 to 84%, preferably 71 to 82%, preferably 72 to 80%, preferably 73 to 78%, preferably 74 to 77%, preferably 74.5 to 77%, preferably 75 to 76%, preferably 75.5 to 75.75% of a permeability of a corresponding concrete which lacks the olive waste.

The presently disclosed cementitious blend and concrete mix may be applicable to other cementing operations known in the art, including, without limitation, long string cementing, liner cementing, inflatable packer cementing, and squeeze cementing. Such cementing operations may be drilling, completion and remedial cementing operations, including those performed on existing completed wellbores, as well as those performed during well abandonment operations.

The examples below are intended to further illustrate protocols for preparing and characterizing the carbonation-resistant cementitious blend as well as concrete formed by the carbonation-resistant cementitious blend and are not intended to limit the scope of the claims.

Where a numerical limit or range is stated herein, the endpoints are included. Also, all values and subranges within a numerical limit or range are specifically included as if explicitly written out.

Numerous modifications and variations of the present invention are possible in light of the above teachings. It is therefore to be understood that, within the scope of the appended claims, the invention may be practiced otherwise than as specifically described herein.

Examples

Materials

Four cement slurries were prepared from mixtures of Saudi Class G oil well cement with different complementary additives including silica flour, defoamer, expandable material, fluid loss additive, dispersion agent, and olive waste. Saudi Class G cement and the complementary additives were provided by a service company. The composition of Saudi Class G cement is summarized in Table 1.

Figure 1:
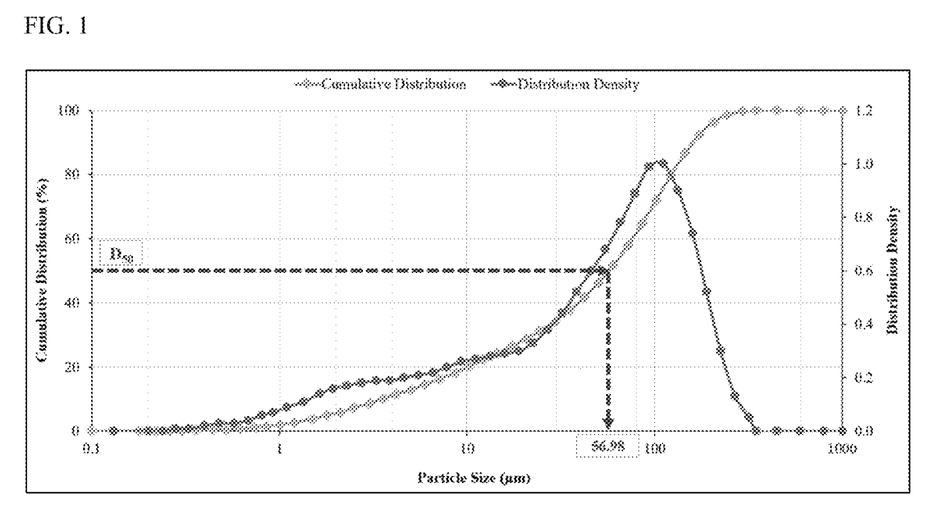
FIG. 1 is a plot of the particle size distribution of particles of the olive waste.
Figure 2:
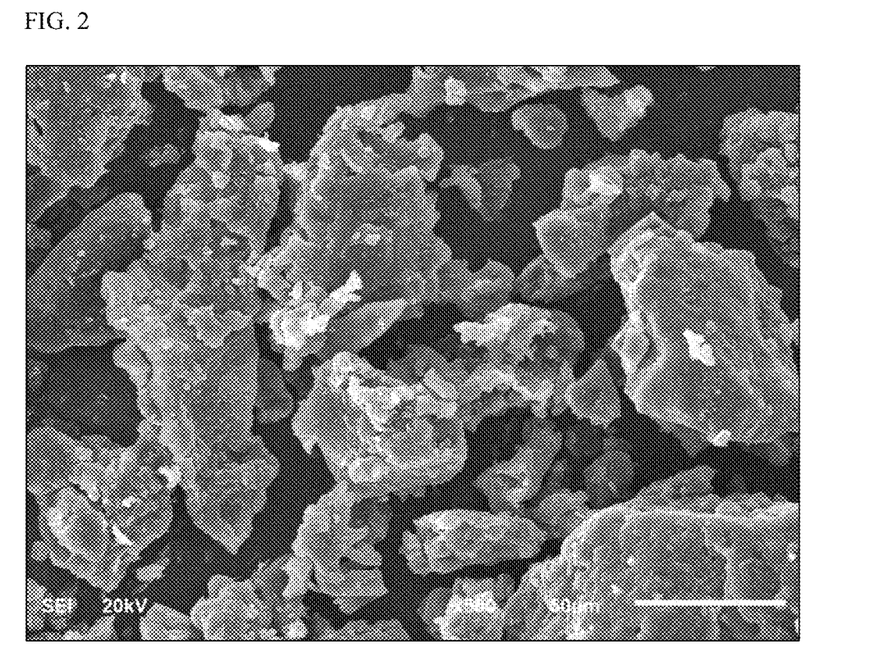
FIG. 2 is a SEM image of particles of the olive waste.

The olive waste material was a mixture of the waste material obtained from the process of olive oil hot extraction (i.e. olive skin, stones, and pulp) which was used directly after grinding and without heating or any pretreatment. The olive waste had a $D_{50}$ of 56.98 microns and with the particle size distribution shown in FIG. 1. A SEM image of the olive waste used is shown in FIG. 2. Table 2 lists the mineralogical composition of the olive waste by PXRD. Table summarizes the elemental composition of the olive waste by X-ray fluorescence (XRF). As indicated in this table, the olive waste is composed mostly of potassium (69.01%) and contains 9.70, 9.50 and 6.18 of Cl, Ca, and Fe, respectively.

All cement slurries were prepared according to industry standards (API, 2005; API, 2013) using a water-to-cement ratio of 0.44 [API Spec. 10A, Specification for Cements and Materials for Well Cementing, 23rd edition. 2002. Washington, D.C.: AP; and API RP 10B, Recommended Practice for Testing Well Cements, 22nd edition. 1997. Washington, D.C.: API, each of which is incorporated herein by reference in its entirety]. Table 4 compares the composition of the four cement slurries prepared. As indicated in this table all cement slurries have the same concentration of the different additives except the olive waste, which is added to slurries OW0, OW1, OW2, and OW3 at concentrations of 0.0, 0.1, 0.2, and 0.3% BWOC, respectively.

TABLE 1

The composition of Saudi Class G cement as characterized by the XRD analysis

| Component | Concentration (wt %) |
|---|---|
| Silica | 21.6 |
| Alumina | 3.30 |
| Iron Oxide | 5.99 |
| Calcium Oxide | 64.2 |
| Magnesium Oxide | 1.10 |
| Sulphur Trioxide | 2.20 |
| Loss on Ignition | 0.90 |
| Insoluble Residue | 0.30 |
| Equivalent Alkali | 0.41 |

TABLE 2

The mineralogical composition of the olive waste by PXRD

| Mineral | Concentration (weight %) |
|---|---|
| Sylvite | 69.2 |
| Tridymite | 18.5 |
| Quartz | 12.3 |

TABLE 3

The composition of olive waste as characterized by the XRF analysis

| Element | Concentration |
|---|---|
| Al | 0.37 |
| Si | 0.81 |
| P | 0.92 |
| S | 0.89 |
| Cl | 9.70 |
| K | 69.01 |
| Ca | 9.50 |
| Mn | 0.07 |
| Fe | 6.18 |
| Ni | 0.01 |
| Cu | 0.04 |
| Zn | 0.10 |
| As | 0.01 |
| Ba | 2.40 |

TABLE 4

Cement slurries composition.

| Slurries | Silica Flour (% BWOC) | Disersion Agent (% BWOC) | Expandable Agent (% BWOC) | Fluid Loss Controller (% BWOC) | Defoamer (% BWOC) | Olive Waste (% BWOC) |
|---|---|---|---|---|---|---|
| OW0 | 35 | 0.8 | 1.0 | 0.7 | 4.7E−07 | 0.0 |
| OW1 | 35 | 0.8 | 1.0 | 0.7 | 4.7E−07 | 0.1 |

TABLE 4-continued

Cement slurries composition.

| Slurries | Silica Flour (% BWOC) | Disersion Agent (% BWOC) | Expandable Agent (% BWOC) | Fluid Loss Controller (% BWOC) | Defoamer (% BWOC) | Olive Waste (% BWOC) |
|---|---|---|---|---|---|---|
| OW2 | 35 | 0.8 | 1.0 | 0.7 | 4.7E–07 | 0.2 |
| OW3 | 35 | 0.8 | 1.0 | 0.7 | 4.7E–07 | 0.3 |

Methodology

Figure 3:
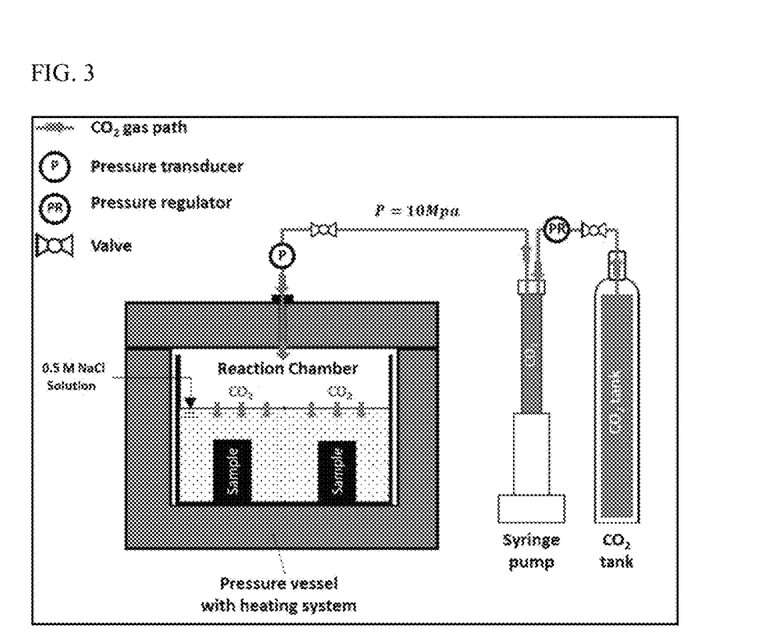
FIG. 3 is a schematic drawing of the high-pressure high-temperature reaction chamber used to evaluate carbonation of the concrete.

The cement slurries were prepared according to the standards published by the American Petroleum Institute (API). After preparation, the slurries were poured into different cylindrical and cubical molds to make cement samples with different dimensions, the molds were then immersed into deionized water inside a water bath at 75° C., and the samples were kept inside the water bath for 24 hour and then demolded. After that the samples were immersed inside deionized water in the high-pressure high-temperature reaction vessel of FIG. 3.

$CO_2$ was injected into the reaction vessel at 500 psi and temperature of the vessel was increased to 130° C. during 4 hours, during this time the pressure of the vessel was allowed to increase due to the expansion of the $CO_2$, the vessel pressure was kept at 1500 psi using a relief value which is adjusted to bleed the expanded $CO_2$ when the pressure exceeded 1500 psi. The samples were then allowed to react with the saturated $CO_2$ brine for 10 days.

After the end of the reaction time, the carbonated cement samples were removed from the reaction vessel and the change in the compressive and tensile strength, permeability, and carbonation depth inside different cement samples was evaluated.

Compressive Strength Measurement

The compressive strength was evaluated for all cement samples considered in the study following the API standard for testing well cements [API RP 10B, Recommended Practice for Testing Well Cements, 22nd edition. 1997. Washington, D.C.: API, incorporated herein by reference in its entirety]. The samples considered for the compressive strength measurement are with the dimensions of 2" by 2" by 2", the compressive strength measurement for every cement sample was repeated three times on three different specimens, then the compressive strength of every cement sample was calculated as the averaged value of the three measurements.

Tensile Strength Measurement

The tensile strength of the cement samples was evaluated using indirect measurement (Brazilian tensile strength). Three samples representing every specimen considered in this work were prepared for tensile strength measurement with 1.5" in length and 0.9" in diameter. Then the tensile strength of every specimen was calculated as the average strength of the three samples. During the measurement, the samples were exposed to an increasing load (at a rate of 1.5 KN/second) at two opposite points along the sample's circumference until the sample fails under tension, the maximum load that the sample could withstand represents its tensile strength [Mahmoud, A. A., et. al., Proceedings of the 2018 Abu Dhabi International Petroleum Exhibition & Conference, Abu Dhabi, UAE, 12-15 Nov. 2018. SPE-193059-MS, incorporated herein by reference in its entirety].

Then the tensile strength was determined indirectly as a function of the maximum load the sample could withstand before falling and the sample's dimensions using Eq. (1).

$$\sigma_t = \frac{2P}{\pi d l} \tag{1}$$

where $\sigma_t$ is the Brazilian tensile strength in (MPa), P denotes the maximum load the sample could withstand before failure in (N), d and l denote the diameter and length of the cement sample, respectively, both are in (mm).

Permeability Measurement

The permeability was measured following the procedures explained by Sanjuán and Muñoz-Martialay and applying Hagen-Poiseuille law which is widely used to determine the permeability of the porous media using compressible fluid undergoes laminar flow at steady-state conditions [Sanjuán, M. A. and Muñoz-Martialay, R., Journal of Material Science, 1995, 30, 5657-5662; and Mahmoud, A. A., et. al., Materials, 2019, 12, 9, 1452, each of which is incorporated herein by reference in its entirety]. Cylindrical samples of 1.5" in diameter and 0.6" in length were used for permeability measurement.

Carbonation Depth Results

Figure 4:
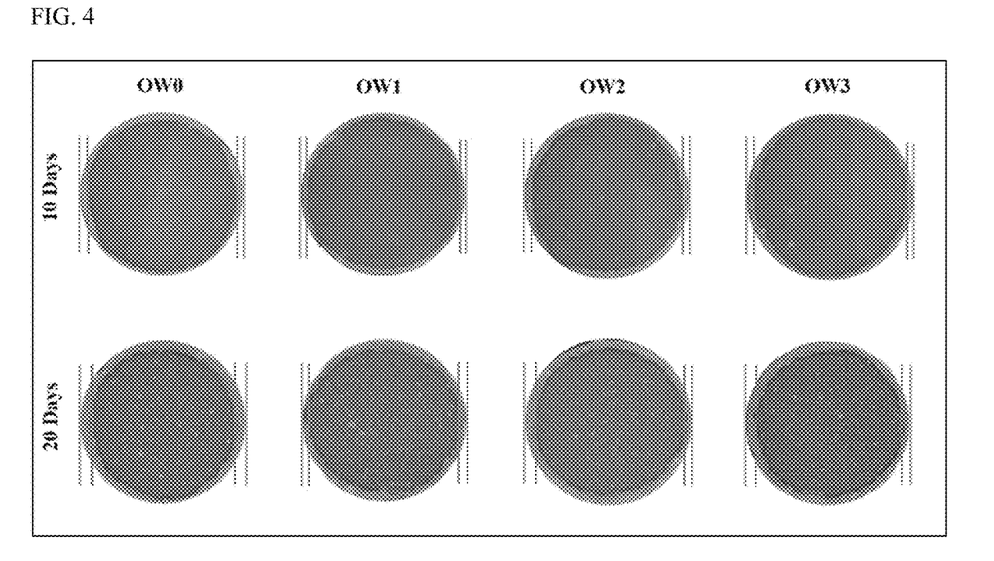
FIG. 4 shows images of the carbonation depth for samples OW0, OW1, OW2, and OW3 after reacting into the $CO_2$ saturated brine for 10 and 20 days at 130° C. and 1500 psi.

FIG. 4 compares the carbonation depths of the $CO_2$ saturated brine (outer brown region) inside the different cement samples evaluated in this study. The photos in FIG. 4 indicate that the carbonation depth inside sample OW1 is the lowest. This result indicates that including 0.1% BWOC of olive waste into the cement slurry improved the carbonation resistance of the cement. Incorporating 0.2% and 0.3% of the olive waste into samples OW2 and OW3 did not reduce the carbonation depth.

Figure 5A:
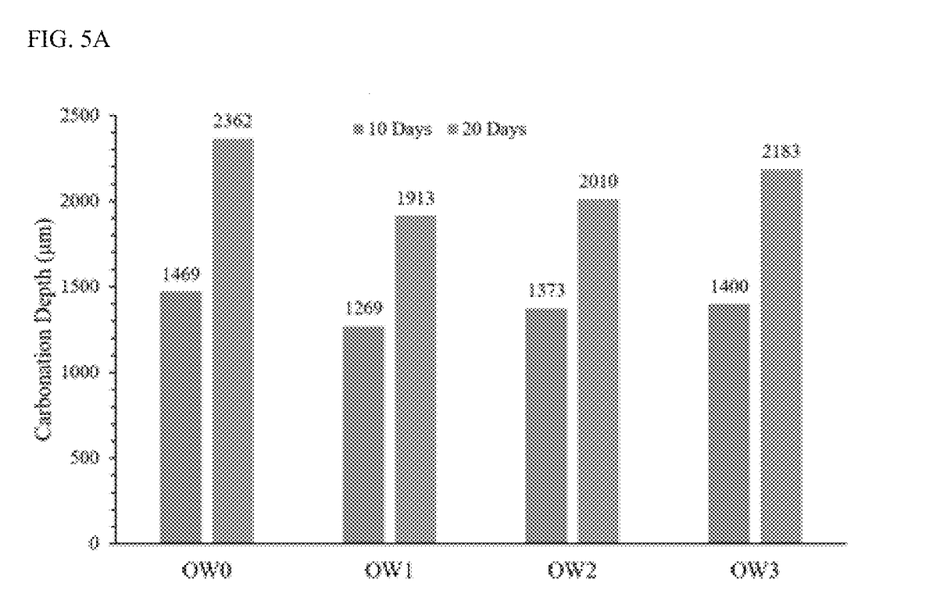
FIG. 5A is a graph of the carbonation depth for samples OW0, OW1, OW2, and OW3 after reacting into the $CO_2$ saturated brine for 10 and 20 days at 130° C. and 1500 psi.
Figure 5B:
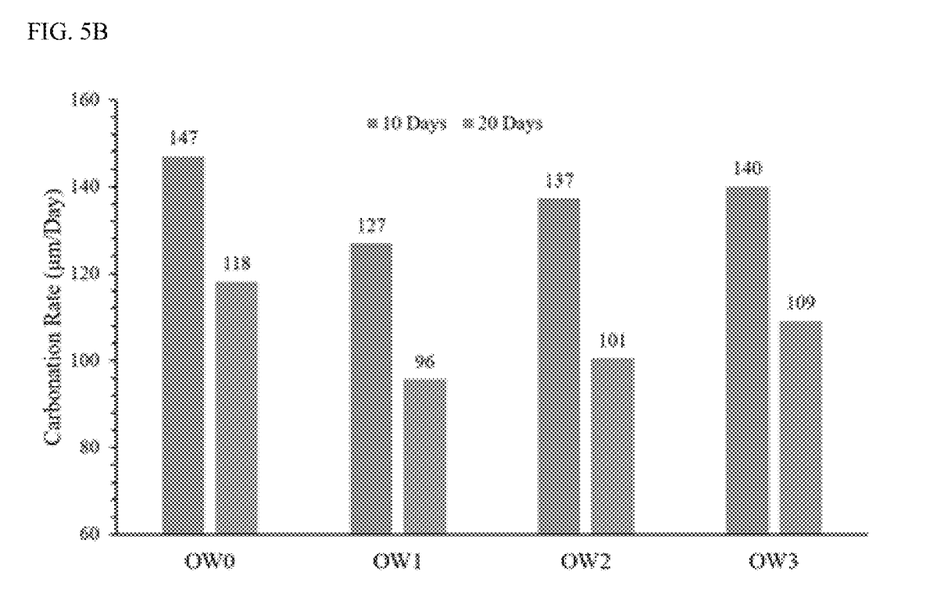
FIG. 5B is a graph of the carbonate rate for samples OW0, OW1, OW2, and OW3 after reacting into the $CO_2$ saturated brine for 10 and 20 days at 130° C. and 1500 psi.

FIGS. 5A and 5B compare the carbonation depth and carbonation rate inside all cement samples under study. As indicated in FIG. 5a, the carbonation depths inside the base sample were 1469 and 2362 µm after 10 and 20 days of reaction, respectively. The carbonation depth were decreased to 1269 and 1913 µm after 10 and 20 days of reaction, respectively, by incorporating 0.1% BWOC of the olive stone in sample OW1. Sample OW1 has the lowest carbonation depth among the other samples. The carbonation depths inside sample OW1 were 13.6% and 19.0% less than that inside the base sample (OW0) after 10 and 20 days of reaction, respectively. The carbonation depths inside samples OW2 and OW3 were higher than these for sample OW1.

The carbonation rate inside sample OW1 was the lowest among the other samples (FIG. 5b), the carbonation rate inside sample OW1 during the first 20 days of reaction was 96 µm/Day which was 18.6% less than the carbonation rate inside sample OW0 (118 µm/Day).

Compressive Strength Results

Figure 6:
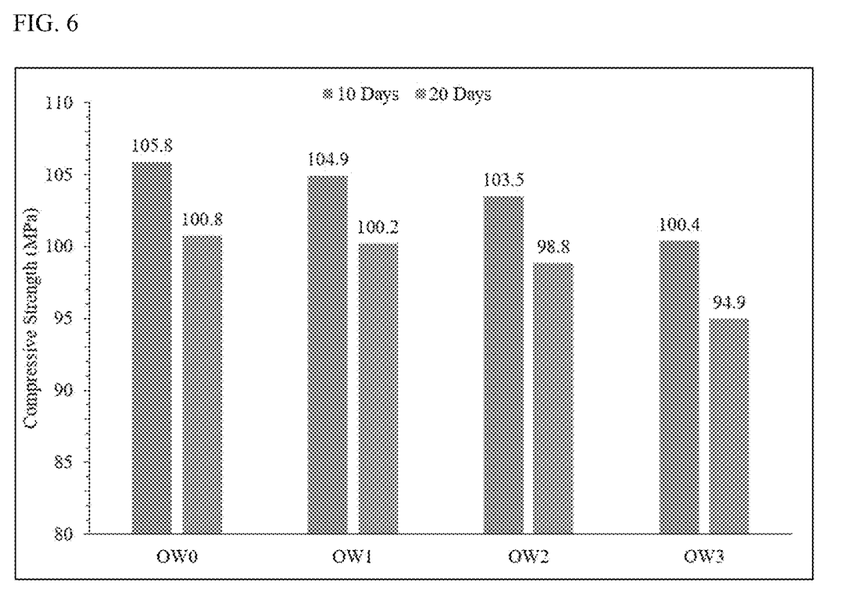
FIG. 6 is a graph of the compressive strength of samples OW0, OW1, OW2, and OW3 after reacting into the $CO_2$ saturated brine for 10 and 20 days at 130° C. and 1500 psi.

FIG. 6 compares the compressive strength of the base and olive waste-based cement samples after being exposed to the $CO_2$-saturated brine for 10 and 20 days. This figure shows that the base sample (OW0) compressive strengths were 105.8 and 100.8 MPa after reacting with the $CO_2$-saturated brine for 10 and 20 days, respectively, with a decrease of 4.7% for the samples reacted for 20 days compared to these reacted for 10 days.

In general and regardless of the carbonation duration, the compressive strength of sample incorporating olive stone was found to decrease with the increase in the olive stone concentration. The rate of the decrease is very low. Samples OW1, OW2, and OW3 have compressive strengths of 100.2, 98.8, and 94.9 MPa which were 0.6%, 2.0%, and 5.9%, respectively, less than the compressive strength of the base cement OW0 (100.8 MPa) after reacting with the acidic brine for 20 days.

Tensile Strength Results

Figure 7:
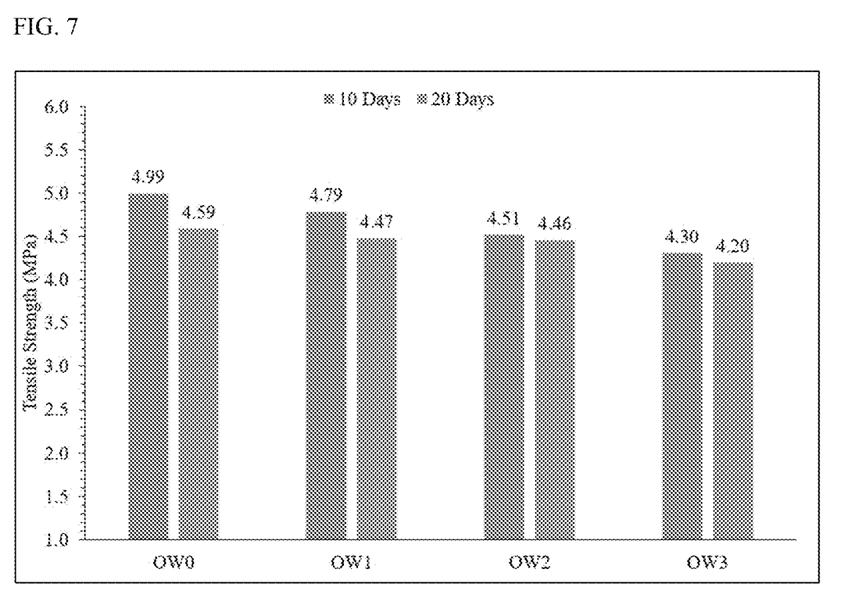
FIG. 7 is a graph of the tensile strength of samples OW0, OW1, OW2, and OW3 after reacting into the $CO_2$ saturated brine for 10 and 20 days at 130° C. and 1500 psi.

The tensile strength of the base and olive waste-based cement samples reacted with the $CO_2$-saturated brine for 10 and 20 days are shown in FIG. 7. As shown in FIG. 7, the base cement (i.e sample OW0) tensile strengths after being exposed to $CO_2$-saturated brine for 10 and 20 days, were 4.99 and 4.59 MPa, respectively. The tensile strength of sample OW0 decreased by 12.5% when reacted for 20 days compared to sample OW0 reacted for 10 days.

Overall, increasing the olive waste concentration slightly decreased the cement tensile strength regardless of the reaction time. After 20 days of soaking into $CO_2$ saturated brine, samples OW1, OW2, and OW3 had tensile strengths of 4.47, 4.46 and 4.20 MPa which were 2.6%, 2.8% and 8.5% less than the tensile strength of the base cement (OW0) of 4.59 MPa.

Permeability Results

Figure 8:
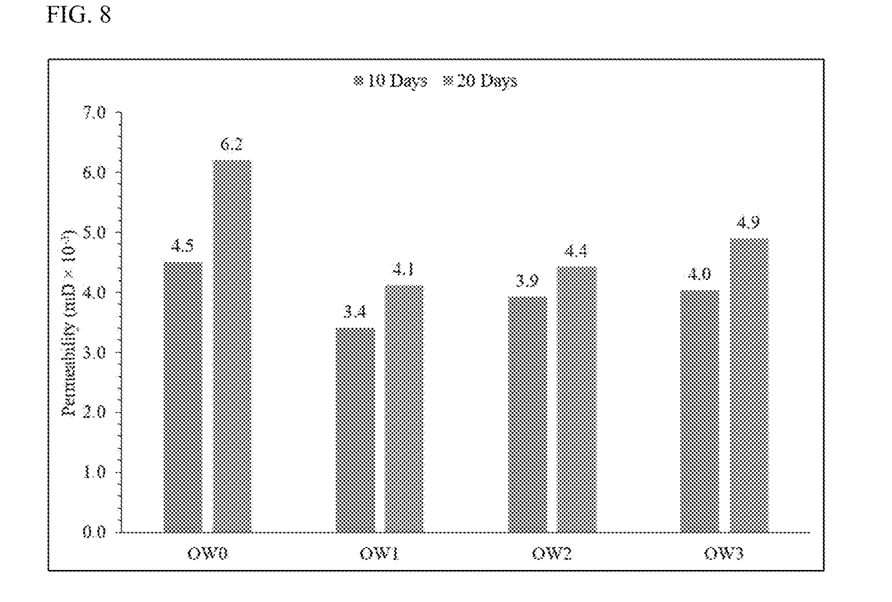
FIG. 8 is a graph of the porosity of samples OW0, OW1, OW2, and OW3 after reacting into the $CO_2$ saturated brine for 10 and 20 days at 130° C. and 1500 psi.

FIG. 8 shows the permeability of all cement samples after being exposed to $CO_2$-saturated brine for 10 and 20 days. FIG. 8 indicates that base cement sample OW0 permeabilities were 0.0045 and 0.0062 mD after being exposed to the $CO_2$ saturated brine for 10 and 20 days. When the base cement was exposed to $CO_2$-saturated brine for 20 days, its permeability increased by 37.8% compared to when the sample OW0 is reacted for 10 days. The permeability of the cement samples decreased when 0.1% BWOC of the olive waste was incorporated into the base cement, and then the permeability increased with the increase in the olive concentration.

After 10 days of reaction, the permeability of sample OW1 was 0.0034 mD which was 24.4% less than the permeability of sample OW0, while samples OW2 and OW3 had permeabilities of 0.0039 and 0.0040 mD which were 14.7% and 17.6% greater than the permeability of sample OW1, respectively. After 20 days of carbonation, the permeability of sample OW1 was 0.0041 mD which was 33.9% less than the permeability of sample OW0, while samples OW2 and OW3 permeabilities were 7.3% and 19.5% greater than the permeability of sample OW1.

The decrease in the permeability may be an important characteristic of the cement matrix advantageous for reducing the effect of acids invasion and increasing the cement carbonation resistance. The decrease in the cement permeability has been considered as a mechanism that helps in mitigating the cement degradation under carbonation [Šavija, B., and Luković, M., Construction and Building Materials, 2016, 117, 285-301, incorporated herein by reference in its entirety]. The decrease in the permeability for sample OW1 compared to all other samples is considered to effectively improve its carbonation resistance by decreasing the hydrochloric acid invasion. As shown in FIG. 4, the carbonation depth inside sample OW1 is the lowest compared to other samples. This decrease in the cement permeability will also improve the ability of the cement to prevent $CO_2$ leakage from the storage formations.

The invention claimed is:

1. A carbonation-resistant cementitious blend comprising:
   cement;
   silica flour present in an amount of 30 to 40% by weight of cement (% BWOC);
   an expandable agent present in an amount of 0.4 to 2% BWOC;
   a dispersion agent present in an amount of 0.5 to 1.0% BWOC;
   a fluid loss additive present in an amount of 0.5 to 1.0% BWOC;
   a defoamer present in an amount of $1 \times 10^{-8}$ to $1 \times 10^{-6}$% BWOC; and
   an olive waste present in an amount of 0.01 to 0.75% BWOC.

2. The carbonation-resistant cementitious blend of claim 1, wherein the olive waste comprises:
   60 to 75 atom % potassium,
   7.5 to 11.5 atom % Ca;
   7.5 to 11.5 atom % Cl; and
   2 to 10 atom % Fe, with a balance being formed from at least one element selected from the group consisting of Al, Si, P, S, Mn, Ni, Cu, Zn, As, and Ba by X-ray fluorescence, based on a total number of atoms of X-ray fluorescence-active elements present in the olive waste.

3. The carbonation-resistant cementitious blend of claim 1, wherein the olive waste comprises pulp, skin, and stone from the fruit of a plant from the genus *Olea*.

4. The carbonation-resistant cementitious blend of claim 1, wherein the olive waste comprises crystalline sylvite, crystalline tridymite, and crystalline quartz by PXRD.

5. The carbonation-resistant cementitious blend of claim 4, wherein the olive waste comprises by PXRD:
   50 to 87.5 wt % sylvite;
   7.5 to 30 wt % tridymite; and
   5 to 20 wt % quartz, based on a total weight of crystalline material present in the olive waste.

6. The carbonation-resistant cementitious blend of claim 1, wherein the olive waste is present as particles having a median particle size ($D_{50}$) of 25 to 100 μm.

7. The carbonation-resistant cementitious blend of claim 1, wherein the cement is Saudi Class G cement.

8. The carbonation-resistant cementitious blend of claim 1, wherein the olive waste is substantially free of wood.

9. A carbonation-resistant concrete mix comprising water and the carbonation-resistant cementitious blend of claim 1.

10. The carbonation-resistant concrete mix of claim 9, having a water-to-cement weight ratio of 0.35 to 0.55.

11. A concrete formed from the carbonation-resistant concrete mix of claim 9 after hardening.

12. The concrete of claim 11, having a tensile strength of 4.10 to 4.95 MPa after contacting a solution of $CO_2$-saturated brine at 130° C. and 1500 PSI for 20 days.

13. The concrete of claim 11, which has a tensile strength after contacting a solution of $CO_2$-saturated brine at 130° C. and 1500 PSI for 20 days which is 90.0 to 99.0% of a tensile strength of a corresponding concrete which lacks the olive waste subjected to the contacting.

14. The concrete of claim 11, having a compressive strength of 95 to 105 MPa after contacting a solution of $CO_2$-saturated brine at 130° C. and 1500 PSI for 20 days, the compressive strength measured according to API RP 10B.

15. The concrete of claim 11, which has a compressive strength after contacting a solution of $CO_2$-saturated brine at 130° C. and 1500 PSI for 20 days which is 92.5 to 99.9% of a compressive strength of a corresponding concrete which lacks the olive waste subjected to the contacting, the compressive strength measured according to API RP 10B.

16. The concrete of claim 11, having a mean carbonation rate of 85 to 115 μm/day over 20 days contacting a solution of $CO_2$-saturated brine at 130° C. and 1500 PSI.

17. The concrete of claim 11, which has a mean carbonation rate day over 20 days contacting a solution of $CO_2$-saturated brine at 130° C. and 1500 PSI which is 70 to 90% of a mean carbonation rate of a corresponding concrete which lacks the olive waste subjected to the contacting.

18. The concrete of claim 11, which has a permeability of 0.0030 to 0.0044 mD after contacting a solution of $CO_2$-saturated brine at 130° C. and 1500 PSI for 10 days.

19. The concrete of claim 11, which has a permeability after contacting a solution of $CO_2$-saturated brine at 130° C. and 1500 PSI for 10 days which is 65 to 90% of a permeability of a corresponding concrete which lacks the olive waste subjected to the contacting.

20. A method of cementing a portion of a wellbore, the method comprising:
- introducing the carbonation-resistant concrete mix of claim 9 into the portion of the wellbore; and
- allowing the carbonation-resistant concrete mix to cure thereby forming a wellbore cement.

* * * * *